United States Patent [19]

Abed

[11] Patent Number: 4,755,977

[45] Date of Patent: Jul. 5, 1988

[54] RUNOUT COMPENSATION FOR A COARSE TRACKING SERVO SYSTEM IN AN OPTICAL DISK STORAGE UNIT

[75] Inventor: Majeed Abed, Lafayette, Colo.

[73] Assignee: Storage Technology Partners II, Louisville, Colo.

[21] Appl. No.: 917,955

[22] Filed: Oct. 14, 1986

Related U.S. Application Data

[62] Division of Ser. No. 627,790, Jul. 5, 1984, abandoned.

[51] Int. Cl.$^4$ .................. G11B 17/22; G11B 7/095; G11B 21/10
[52] U.S. Cl. ........................... 369/32; 369/33; 369/41; 369/44; 369/46; 360/77; 360/78
[58] Field of Search ............... 369/32, 33, 41, 44, 369/46; 365/234, 215; 360/77, 78

[56] References Cited

U.S. PATENT DOCUMENTS

| | | | |
|---|---|---|---|
| 3,906,326 | 9/1975 | Chur | 369/41 |
| 4,094,010 | 6/1978 | Pepperl et al. | 365/234 |
| 4,135,217 | 1/1974 | Jacques et al. | 360/77 |
| 4,136,365 | 1/1979 | Chick et al. | 360/78 |
| 4,149,198 | 4/1979 | Behr et al. | 360/76 |
| 4,236,232 | 11/1980 | Jansen et al. | 369/44 |
| 4,290,122 | 9/1981 | Bates et al. | 369/46 |
| 4,445,144 | 4/1984 | Giddings | 369/44 |
| 4,459,690 | 7/1984 | Corsouer et al. | 369/46 |
| 4,476,555 | 10/1984 | Joichi et al. | 369/44 |
| 4,507,763 | 3/1985 | Kato | 369/44 |

FOREIGN PATENT DOCUMENTS

| | | | |
|---|---|---|---|
| 57-53830 | 3/1982 | Japan | 369/44 |
| 2085192 | 4/1982 | United Kingdom | 369/44 |

OTHER PUBLICATIONS

IBM Technical Disclosure Bulletin; vol. 16, No. 4, Sep. 1973 Schneider, Optical Servo Information on Magnetic Recording Disks, p. 108.

Primary Examiner—Raymond F. Cardillo
Assistant Examiner—Hoa T. Nguyen
Attorney, Agent, or Firm—Woodcock Washburn Kurtz Mackiewicz & Norris

[57] ABSTRACT

An optical disk storage unit has an access and tracking system with a microprocessor which stores a runout signal representing the eccentricity of the tracks and bands as a function of the rotation of the disk surface. The runout signal is summed with the output of the access and tracking system to compensate for eccentricity as the disk rotates.

3 Claims, 6 Drawing Sheets

RUNOUT COMPENSATION FOR A COARSE TRACKING SERVO SYSTEM IN AN OPTICAL DISK STORAGE UNIT

This is a continuation of application Ser. No. 627,790, filed July 5, 1984, now abandoned.

BACKGROUND OF THE INVENTION

This invention relates to optical disk storage units, and more particularly, to runout compensation for the tracking servo system in optical disk storage units.

Optical data storage units which utilize a disk to optically store information typically employ a servo system which controls the positioning of the read/write head to provide direct access to a given track of data. See, for example, U.S. application Ser. No. 438,133, filed Nov. 1, 1982, Stahl et al, now abandoned, its continuing application Ser. No. 755,953, filed July 16, 1985, now abandoned, its continuing application Ser. No. 917,259, filed Oct. 8, 1986 and corresponding PCT application, International Publication No. WO84/01849, published May 10, 1984, which show an exemplary servo system for an optical disk storage unit.

Two tracking servo systems are most often employed to enable accurate reading and writing of data from or to data tracks. A coarse servo tracking system radially positions the optical head over a desired data band on the disk. A fine servo tracking system then optically (through the use of tracking mirrors attached to a galvonometer) positions the read/write beams on a desired track(s) within the data band.

Galvonometer controlled tracking mirrors have a limited radial range, hence the necessity for a coarse servo system that: (1) radially positions the optical head over a desired data band where the desired data track is located (coarse seeking), and (2) maintains the head in this desired position (coarse tracking). The coarse tracking servo accurately maintains the head with respect to a precision coarse servo track previously written on the disk, which coarse servo track is adjacent to the data band of concern.

Because replaceable media, or disks, are used, the disks cannot be perfectly aligned on the spindle of the drive. Runout caused by the eccentricity of the tracks and bands as a function of the rotation of the disk surface is associated with any given coarse servo track and its respective data band.

The coarse tracking servo must be able to sense this runout and eliminate its effects so that as far as the fine tracking servo is concerned, it is as though the disk were always "perfectly aligned" on the spindle. Otherwise, the limited range and tracking capability of the fine tracking servo will be severely challenged, and in some instances it may be unable to properly follow the desired track.

In an exemplary embodiment, runout may easily exceed 100 μm. (microns). The coarse tracking servo is designed to reduce this runout, as seen by the fine servo system, to around 5 μm. Unfortunately, when the gain of the coarse tracking servo is increased sufficiently to reduce the effective runout to around 5 μm., there may exist undesirable coupling between the fine and coarse tracking servo that adversely affects the overall performance of the optical storage system.

It is an object of the present invention to provide an improved coarse/fine tracking servo system wherein the undesirable coupling between the coarse and fine tracking system is minimized.

It is a further object of the present invention to provide a coarse tracking servo system that includes a runout compensation feature, wherein undesirable runout may be measured and compensation may be made therefor, thereby allowing the coarse trackng servo system to eliminate the undesirable runout without the need of increasing the gain of the coarse tracking servo to the point where the coarse tracking servo is adversely coupled to a fine tracking servo used in conjunction therewith.

RELATED APPLICATIONS

Application Ser. No. 627,774, filed July 5, 1984, M. Abed, et a.—"OPTICAL DISK STORAGE UNIT HAVING A SERVO SYSTEM WITH DIFFERENT VELOCITY INPUTS", now U.S. Pat. No. 4,627,038.

SUMMARY OF THE INVENTION

In accordance with the present invention, a runout signal representing the eccentricity of the servo tracks and data bands as a function of the rotation of the disk surface is stored. During operation of the disk unit, the runout signal is summed with the output of the detector in a servo loop which controls the positioning of the heads. The runout signal has a frequency which is approximately the same as the primary frequency of the rotation of the disk. Provision is also made for compensating for other frequency components associated with the runout.

The present invention allows the gain of the coarse tracking servo to be decreased to the point where 70–80 μm. of exemplary runout would be present, but for the compensation provided by the invention, which compensation reduces the effective runout to less than 5 μm. This reduced gain effectively eliminates undesirable coupling between the coarse and fine tracking systems, yet still keeps the runout as seen by the fine tracking system to an acceptable level.

The foregoing and other objects, features and advantages of the invention will be better understood from the following more detailed description and appended claims.

SHORT DESCRIPTION OF THE DRAWINGS

FIG. 1 depicts the servo system for an optical disk storage on which the present invention is an improvement;

FIG. 1A schematically shows the principal elements of FIG. 1, including the interaction of a band, light source and detector;

DESCRIPTION OF THE PREFERRED EMBODIMENT

Figure 1:
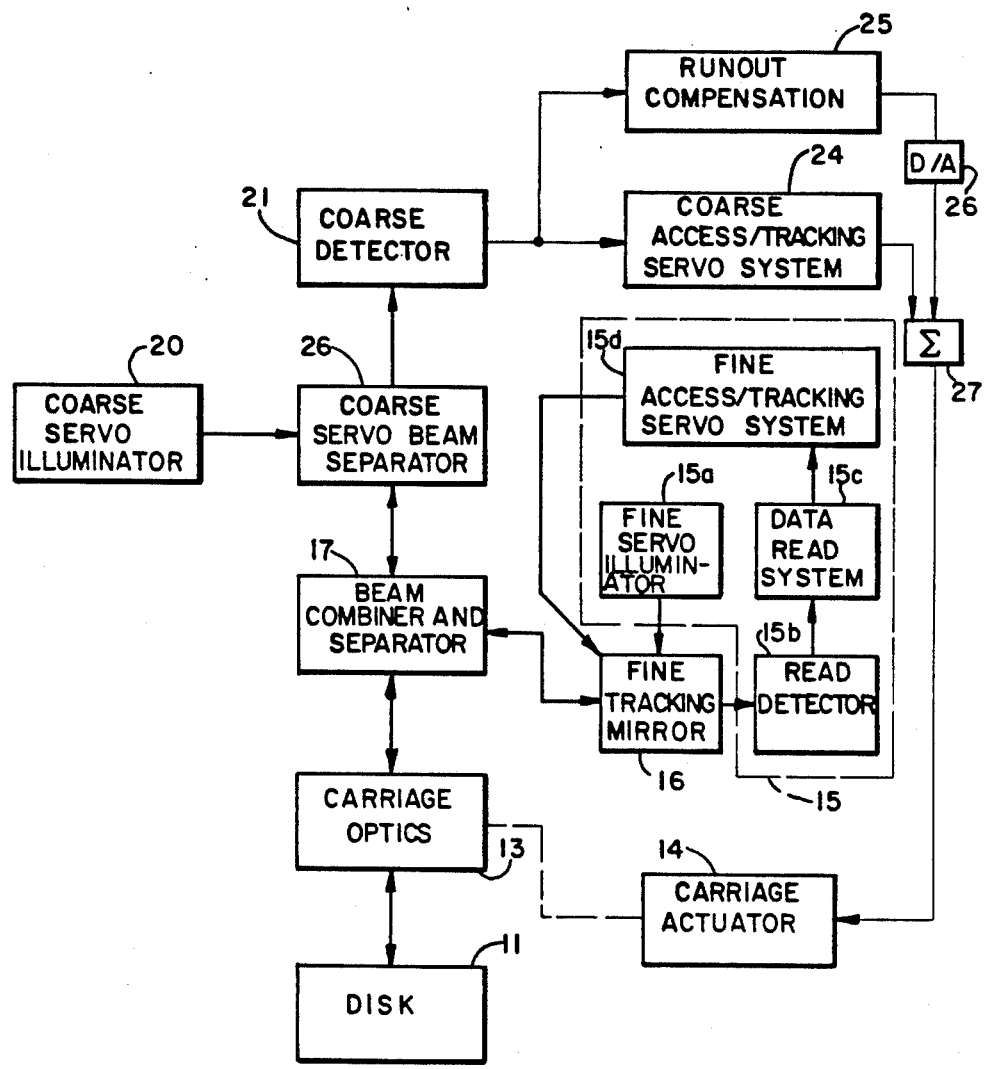

FIG. 1 shows a block diagram of the present invention as it is incorporated within an exemplary servo system in which the various optical paths associated with the system are shown as bold lines, electrical paths are indicated by fine lines, and mechanical coupling is indicated by dashed lines.

Figure 1A:
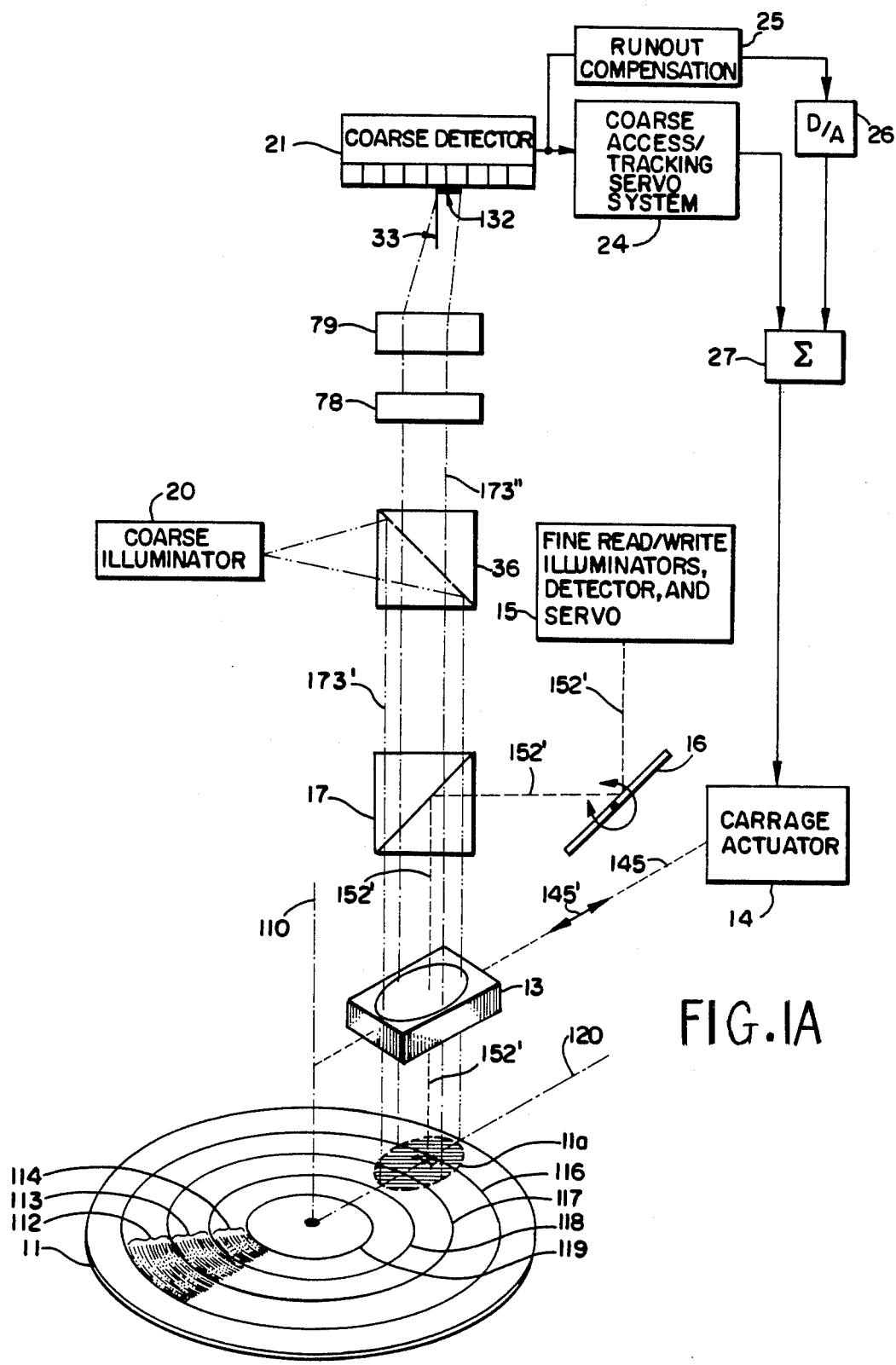

The system allows reading and writing from and to the surface of a disk 11 having a rotational axis 110 and a plurality of concentric data bands 112–114 (FIG. 1A). Each of the data bands includes a plurality of data tracks (represented by dot-and-dashed lines between the data bands) concentrically spaced about the rotational axis. The surface of the disk 11 has pre-recorded thereon, during manufacture, a plurality of optically readable servo tracks 116–119, concentrically and uniformly spaced about the rotational axis of the disk and positioned between the data bands.

An optical read/write head, depicted by the carriage optics 13, is positioned adjacent to the surface of the disk 11. Carriage actuator 14 selectively moves the read/write head along a radial axis 120, thereby moving the carriage optics 13 in a radial direction with respect to the disk 11 in order to access the data bands thereon. Mechanical motion of the carriage optics 13 is depicted in FIG. 1A as a dotted line 145 with motion being possible in both directions as indicated by the double headed arrow 145'.

A fine servo illuminator 15a projects a read or write light beam(s) 152' onto the surface of the disk 11 so as to access data tracks thereon. As is explained more fully hereinafter, the being depicted as the dashed line 152' in FIG. 1A actually comprises several read beams traveling in parallel paths (used for fine tracking and data reading), and may include a write beam, also tracking in a path parallel to the read beams. For simplicity, all of these beams or beam paths are depicted in FIG. 1A as a single beam 152'. In order to access the disk surface this beam 152 is reflected by a fine tracking mirror 16, passes through a beam combiner and separator 17, as well as through the carriage optics 13. A read detector 15b reads light which has been reflected from the accessed recorded data track. This reflected light passes through the carriage optics 13 and beam combiner and separator 17 before reaching the read detector 15b. The read detector converts this light to an equivalent electrical signal(s). This read electrical signal is, in turn, supplied to a data read system 15c, and to a fine access/tracking servo system 15d.

The servo system for access to and tracking of the servo tracks also includes a coarse illuminator 20 which projects light (represented as dashed double dot lines in FIG. 1A) 173' through the coarse servo beam separator 26, the beam combiner and separator 17, and the carriage optics 13 onto a relatively broad portion 11a of the disk surface. A coarse detector 21 detects reflected light 173'' from a portion 11a of the disk surface. The illuminated portion 11a of the disk surface spans at least the distance between two servo tracks, and thereby always illuminates at least one servo track. As shown in FIG. 1A, light is reflected from the portion 11a of the disk 11 between servo tracks 16 and 18 with the image of servo track 17 being projected onto the detector 21 through first lens 78 and second lens 79 as a stripe of light 132. The detector 21 has a center null position. The output of linear detector 21 is applied to a coarse access tracking servo system 24. This system is connected in a servo loop with actuator 14 which moves the read/write head (represented schematically by the carriage optics 13) into radial proximity of a selected servo track so that the fine access and tracking system 15d can accurately position read or write beams on a selected data track.

If the disk 11 is positioned correctly, the image 132 of the servo track 17 is held stationary on the detector 21. However, if the disk 11 is not positioned perfectly, the image 132 will travel up or down on the detector 21 as the disk 11 rotates. The output of the detector 21 is used to drive the actuator 14 in a manner which keeps the image 132 stationary on the detector during track following. Because of this servo action, the fine access/-tracking servo system can perform its function in the same manner as if the disk were perfectly aligned on its spindle. In this manner, the coarse access/tracking servo system compensates for thermal gradients misalignment (which is inherent in removing and replacing the disk) and disk runout. The apparent read runout of the disk as seen by the fine tracking system from its actual total value is thus reduced by the servo system to ±100 to 200 microns (typical of removable media devices) by one to two orders of magnitude. The length of the detector 21 may be slightly less than the imaged servo track separation, i.e., about one servo track pitch (so that only one servo track appears on the detector 21 at a given time. A position error signal is produced by the detector 21 that represents the distance of the imaged servo track from the array center (in null position 33). This signal is then used to provide position feedback to the actuator 24.

Figure 2:
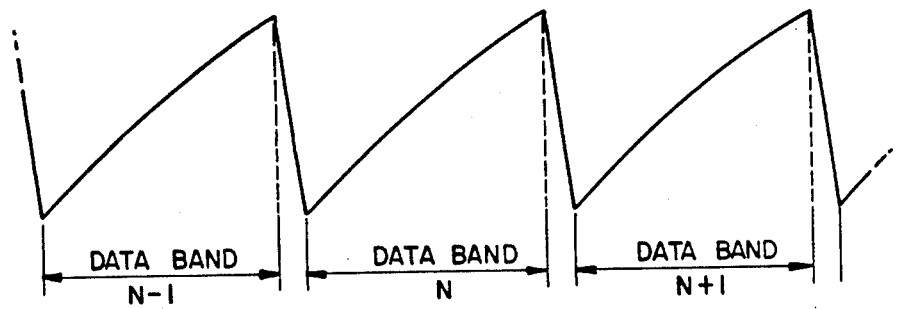
FIG. 2 depicts the output of the coarse access and tracking system detector during a sweep through multiple tracks.

FIG. 2 shows the position error signal which is the output of servo system 24. It is a sawtooth voltage with a succession of ramps produced as the head crosses each of the data tracks.

Figure 3A:
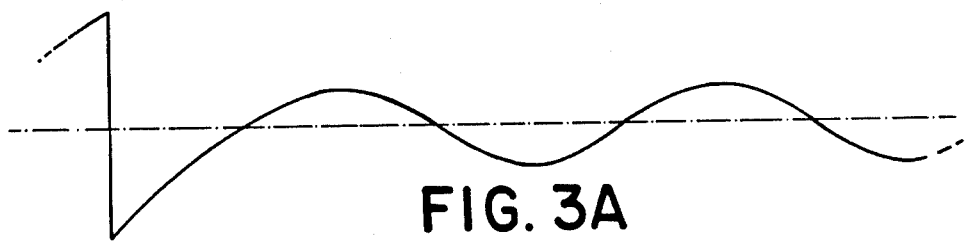
FIG. 3A depicts the output of the detector as it seeks to a particular track.

Referring to FIG. 3A, a portion of the position error signal is shown as the carriage homes in on a particular track. The position error signal approaches the zero level, but then oscillates about the zero level. The primary frequency of this oscillation is approximately 22 Hz, which, in the exemplary embodiment, is the periodicity of the rotatin disk. At this bandwidth, in order to reduce the excursions to a level suitable for proper reading and writing, the gain of the exemplary servo system had to be increased to a level which produced coupling between the fine and coarse servo systems. In order to avoid coupling, only a few db of gain can be used.

Figure 3B:
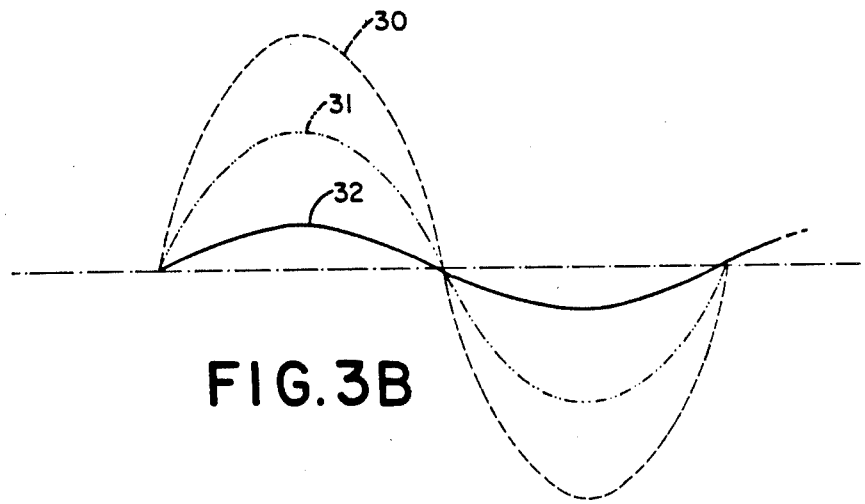
FIG. 3B depicts the error signal with the carriage stationary and the runout moving a track under the head.

In FIG. 3B, the waveform 30 depicts the position error signal without runout compensation or closed loop servo. It is a measure of total runout. In the exemplary embodiment, this signal may exceed 15 volts pk-pk which is associated with approximately 76 microns of runout. In accordance with the present invention, the servo system, with acceptable gain which does not induce coupling, can be used to reduce the amplitude of the oscillating error signal to the level depicted by the waveform 31. The runout signal is then applied in a manner which reduces the position error signal to the level depicted by the waveform 32 which depicts the error signal with runout compensation and closed loop servo. The runout compensation 25 (FIG. 1) of the present invention generates a digital signal which is applied to D/A converter 26 and summed with the position error signal in summer 27.

Figure 4:
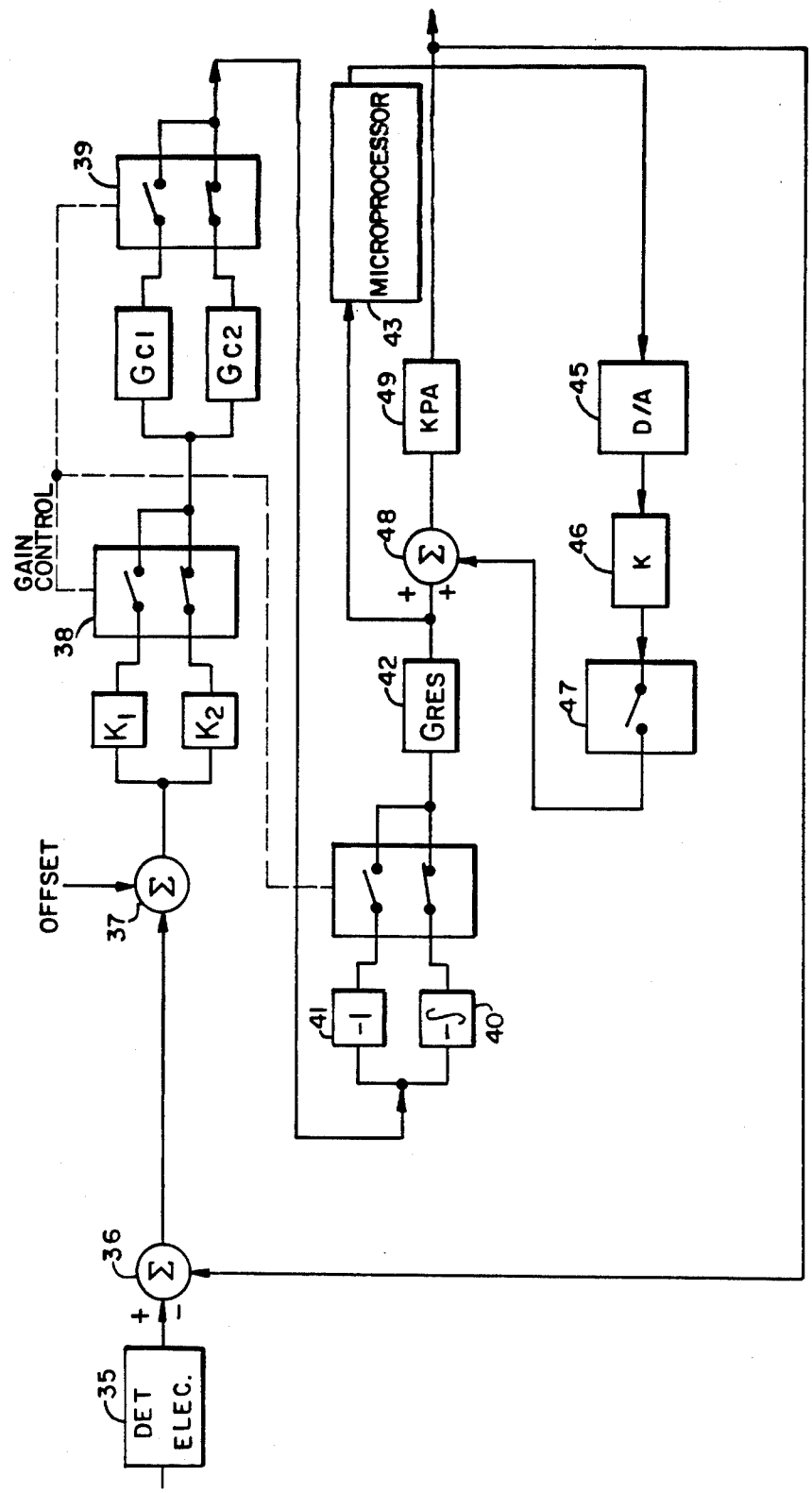
FIG. 4 is a block diagram depicting the system.

FIG. 4 is a block diagram of the servo system. The output of the coarse detector 21 (FIG. 1) is applied to the detector electronics 35. The servo loop summing junction 36 and a summing junction 37 for introducing an offset are including in the loop.

Gain control 38 switches between a high and low gain level, K1 and K2, as needed to reduce effective runout but minimize undesirable coupling between the coarse and fine tracking systems. Corresponding switch 39 produces two levels of compensation $G_{c1}$ and $G_{c2}$. In the high gain mode of operation, the integrator 40 is switched out of the servo loop and unity gain circuit 41 is switched into the circuit to avoid saturation in the high gain mode. A transfer function is applied by amplifier 42.

The amplitude of the runout signal is measured at the output of amplifier 42 and is stored in the microprocessor 43 as a function of disk rotation. The runout can also be measured at the output of the detector electronics and stored, but measuring the runout at the output of amplifier 42 avoids the need for introducing phase shifts and gain adjustments. Microprocessor 43 samples the runout signal 128 times for each revolution of the disk and stores each sample in a lookup table contained within the memory of microprocessor 43.

During operation, the runout signal is read out of the lookup table in microprocessor 43 in synchronism with the rotation of the disk. The runout signal is converted to an analog signal in digital-to-analog converter 45. An appropriate gain compensation is applied as indicated at 46. During normal operation, switch 47 closes the loop so that the runout signal is subtracted from the position error signal in summing circuit 48. The output power amplifier 49 controls the carriage actuator 14 (FIG. 1). This signal is also fed back to the summing junction 36 to close the loop in the servo system.

Figure 5:
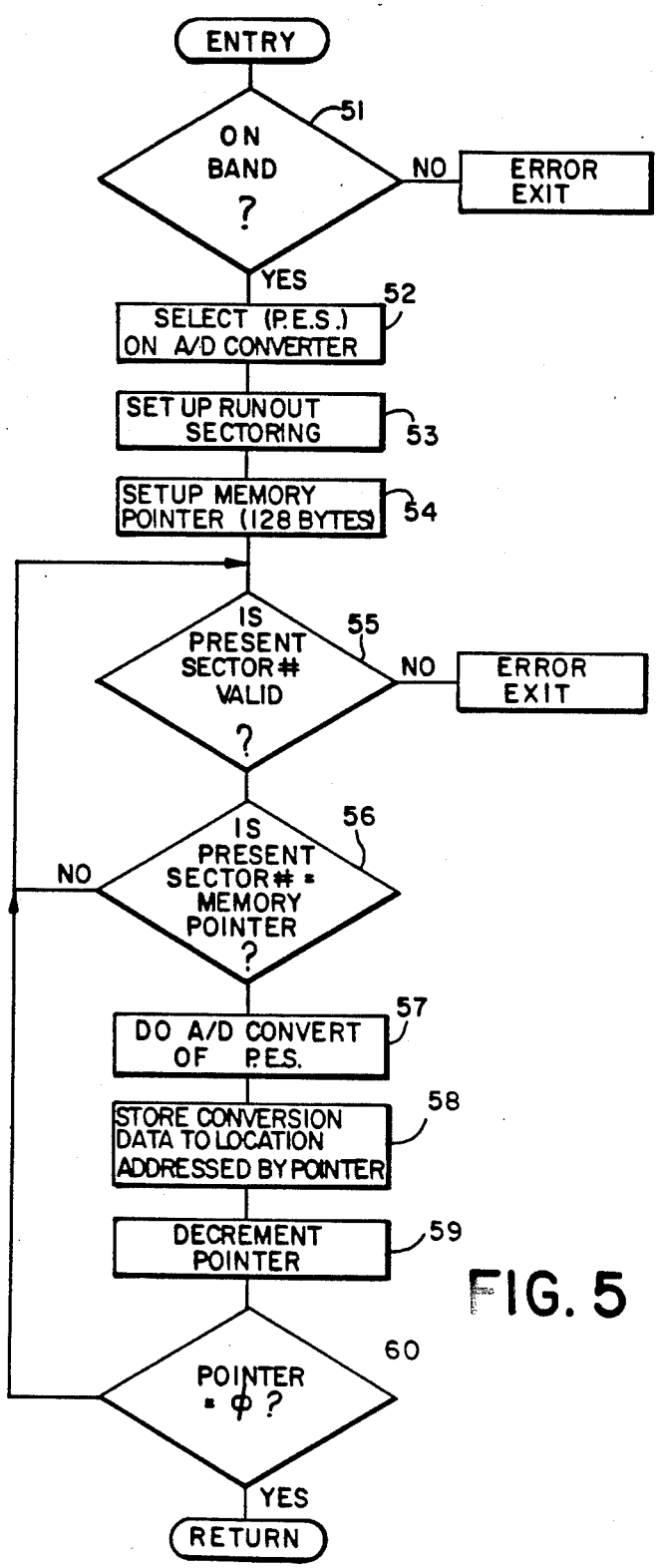
FIG. 5 is a flowchart of producing a runout compensation table in memory.

FIG. 5 shows a flowchart of the method of measuring the runout signal to produce a runout compensation table in the memory of microprocessor 43.

As indicated at 51, a test is made to determine if the servo system is tracking. As indicated at 52, povision is made to select the signal which is measured to set up the table. As previously indicated, the runout is measured at the output of amplifier 42, or at the output of detector electronics 35.

The sampling is synchronized with the disk sectors. The synchronism between the sampling intervals and the disk sectors is set up as indicated at 53. A memory pointer is set to 128 as indicated at 54. The loop for decrementing this pointer includes a sector valid test 55, a determination whether the sector number is equal to the pointer number as indicated at 56, and an analog-to-digital conversion, as indicated at 57. This digital value, representing the runout at a particular sample time is stored in the runout table in memory at the location addressed by the pointer, as indicated at 58. The pointer is decremented as indicated at 59. The loop continues until the pointer is zero, a determination indicated at 60.

Figure 6:
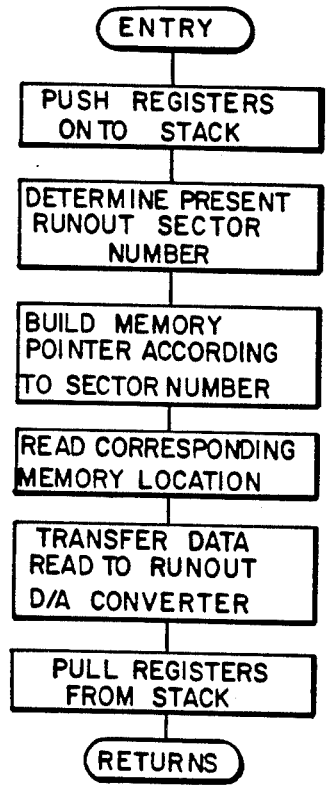
FIG. 6 is a flowchart for implementing runout compensation.

The flowchart of the application of the runout compensation signal during normal operation is depicted in FIG. 6. This routine is called during normal operation once for each complete runout occurrence. The routine synchronizes the samples of the runout signals with the sectors of the rotating disk.

An exemplary code listing is given in the appendix. This particular code sequence was used with a M 68121 microprocessor. The listing is given by way of example only. As with all program listings, it must be adapted for the particular application in which it is to be used and carefully debugged.

While a particular embodiment of the invention has been shown and described, various modifications are within the true spirit and scope of the invention. The appended claims are, therefore, intended to cover all such modifications.

STC-183

APPENDIX

START OF RUNOUT COMP. CODE

```
2627      ********************************************************************
2628      ;    RUNOUT COMPENSATION CODE
2629      * * * * * * * * ERROR CODES * * * * * * * * * * * * * * * * * * * * *
2630      ;
2631      ;        ERROR CODE 14   -   THE COARSE SERVO WAS NOT 'ON BAND'
2632      ;                   15   -   RDS CHECK WAS ACTIVE
2633      ;                   16   -   END OF CONVERT ON THE COARSE CARD DID NOT
2634      ;                                BECOME ACTIVE.
2635      ;                   17   -   ALTERNATE RDS COUNT WAS GREATER THAN 4008
2636      ;
2637      ;        SENSE BYTE 0    -   ERROR CODE
2638      ;                   1    -   RDS POINTER AND DATA POINTER
2639      ;
2640      ;
2641 FDAF 01           ROCOMP: DB      01
2642 FDB0 FD B2                DW      ARUNO1
2643      ;
2644 FDB2 94 79        ARUNOT: LDAA    CSVOST        ;CHECK 'T*' ON BAND
2645 FDB4 84 04                ANDA    #04
2646 FDB6 27 11 FDC9           BEQ     RUN1          ;CONTINUE IF ON BAND IS ACTIVE
2647      ;
```

```
2648 FDB8 86 14              LDAA    #14H            ;ERROR CODE 14, NOT ON BAND
2649 FDBA 97 A0      RUNERR: STAA    _SENSE0
2650 FDBC 86 FF              LDAA    #0FFH
2651 FDBE 97 9F              STAA    _ERRRET         ;SET ERROR RETURN
2652 FDC0 39                 RTS
2653                 ;
2654 FDC1 86 16      RUNE1:  LDAA    #16H            ;ERROR CODE 16, NO END OF CONVERT
2655 FDC3 20 F5 FDBA         BRA     RUNERR
2656                 ;
2657 FDC5 86 17      RUNE2:  LDAA    #17H            ;ERROR CODE 17, RDS COUNT WAS GREATER THAN 1023H
2658 FDC7 20 F1 FDBA         BRA     RUNERR
2659                 ;
2660 FDC9 86 01      RUN1:   LDAA    #01             ;SELECT THE P.E.S ON THE A/D
2661 FDCB 97 7B              STAA    _CRSANL         ;SELECT LATCH
2662                 ;
2663 FDCD 86 7F              LDAB    #7FH            ;POINTER
2664 FDCF D7 A1              STAB    _SENSE0+1
2665                 ;
2666 FDD1 0F        RUN2:    SEI                     ;DO NOT ALLOW INTERRUPTS WHEN READING COUNTER
2667 FDD2 D6 41              LDAB    _CNTR4          ;READ LS BYTE

JSA.SRC  COARSE SERVO  VER 0.0 03/19/84   49

2668 FDD4 59                 ROLB                    ;MS BIT INTO CARRY
2669 FDD5 96 41              LDAA    _CNTR4          ;READ MS BYTE
2670 FDD7 49                 ROLA                    ;6 BIT POINTER
2671 FDD8 59                 ROLB
2672 FDD9 49                 ROLA                    ;7 BIT POINTER
2673                 ;
2674 FDDA 81 80              CMPA    #80H            ;IS RDS VALUE = ILLEGAL ?
2675 FDDC 24 E7 FDC5         BCC     RUNE2           ;BRA IF SO
2676                 ;
2677 FDDE 91 A1              CMPA    _SENSE0+1       ;IS RDS VALUE = POINTER ?
2678 FDE0 26 EF FDD1         BNE     RUN2            ;BRA IF NOT
2679                 ;
2680 FDE2 CE F2 00           LDX     #ROMEM          ;ROMEM = RUN OUT STORAGE,128 BYTES
2681 FDE5 D6 A1              LDAB    _SENSE0+1       ;BUILD POINTER TO TABLE
2682 FDE7 3A                 ABX
2683 FDE8 5A                 DECB                    ;DECREMENT POINTER
2684 FDE9 D7 A1              STAB    _SENSE0+1       ;SAVE POINTER
2685                 ;
2686 FDEB 97 7C              STAA    _CRSCNV         ;WRITE STARTS COARSE A/D CONVERTION
2687                 ;
2688 FDED C6 06              LDAB    #06             ;SHORT DELAY FOR +END OF CONVERT
2689 FDEF 5A        RUN4:    DECB
2690 FDF0 26 FD FDEF         BNE     RUN4
2691                 ;
2692 FDF2 5A        RUN3:    DECB                    ;DECREMENT THE PASS COUNTER
2693 FDF3 27 CC FDC1         BEQ     RUNE1           ;BRA IF TIME OUT W/ OUT END OF CONVERT
2694 FDF5 96 79              LDAA    _CSVOST         ;LOOK FOR END OF CONVERT
2695 FDF7 2A F9 FDF2         BPL     RUN3            ;LOOP IF NO END OF CONVERT
2696                 ;
2697 FDF9 96 78              LDAA    _CRSAD          ;READ RUNOUT DATA
2698 FDFB A7 00              STAA    X               ;STORE DATA IN THE TABLE
2699                 ;
2700 FDFD 8C F2 00           CPX     #ROMEM          ;CHECK TO SEE IF TABLE IS FULL
2701 FE00 26 07 FE09         BNE     RUN5            ;BRANCH IF NOT
2702                 ;
```

```
2703 FE02 FC F2 7C          LDD     ROMEM+7CH       ;
2704 FE05 FD F2 7E          STD     ROMEM+7EH       ;
2705 FE08 39                RTS
2706                        ;
2707 FE09 20 C5 F001 RUN5   BRA     RUN2
2708                        ;
2709                        ;
2710                        ;
2711                        ;
2712                        ;       THIS IS THE RUNOUT COMPENSATION ROUTINE CALLED BY THE WAIT LOOP
2713                        ;       AFTER THE RUNOUT TABLE HAS BEEN FILLED
2714                        ;       THIS ROUTINE TAKES 57 u SECONDS TO RUN INCLUDING JSR & RTS
2715                        ;
2716                        ;
2717 FE0B BD FE 0F  RUNFX1: JSR     RUNFIX          ;UPDATE RUNOUT
2718 FE0E 39                RTS
2719                        ;
2720 FE0F 36       RUNFIX:  PSHA                    ;SAVE REGISTERS
2721 FE10 36                PSHA
2722 FE11 37                PSHB
2723                        ;
2724 FE12 0F                SEI                     ;DISALLOW INTERRUPTS DURING READ
2725 FE13 96 41             LDAA    _CNTR4          ;READ LEAST SIG. BYTE OF THE RDS COUNTER

JSA.SRC  COARSE SERVO  VER 0.0 03/19/84    50

2726 FE15 49                ROLA
2727 FE16 D6 41             LDAB    _CNTR4          ;READ MOST SIG. BYTE OF THE RDS COUNTER
2728 FE18 59                ROLB
2729 FE19 0E                CLI                     ;ALLOW INTERRUPTS
2730 FE1A 49                ROLA
2731 FE1B 59                ROLB                    ;7 BIT POINTER
2732 FE1C C0 09             SUBB    #09             ;SHIFT PHASE
2733 FE1E C4 7F             ANDB    #7FH            ;KEEP # LEGAL
2734                        ;
2735 FE20 CE F2 00          LDX     #ROMEM          ;X = START OF TABLE
2736 FE23 3A                ABX
2737 FE24 E6 00             LDAB    X               ;FETCH RUNOUT VALUE
2738 FE26 53                COMB                    ;INVERT THE DATA
2739 FE27 D7 79             STAB    _RUNCMP         ;WRITE TO D/A
2740                        ;
2741 FE29 33                PULB                    ;RESTORE REGS
2742 FE2A 32                PULA
2743 FE2B 38                PULX
2744 FE2C 39                RTS
2745                        ; END OF RUNOUT COMP. CODE
****************************************************************************
```

I claim:

1. In an optical disk storage unit for reading data from or writing data to a removable disk surface having a rotational axis, a plurality of data bands having data tracks concentrically spaced about said rotational axis, and a plurality of optically readable servo tracks concentrically spaced about said rotational axis between said data bands, said optical disk storage unit having an access and tracking system including a light source for continuously illuminating a portion of said disk surface that spans the width of at least one data band, including at least one servo track, and detector means for detecting light returned from said portion including light returned from said illuminated servo track, wherein said access and tracking system includes a coarse tracking system controlled by the output of said detector means and a fine access and tracking system, including a second light source, responsive to a separate light beam projected from said second light source and reflected by a single data track on said disk, the improvement comprising:

means for rotating said disk surface about said rotational axis;

an optical head positioned adjacent to said disk surface for reading or writing thereon;

means for positioning said head with respect to said disk surface in a radial direction, wherein said means for positioning said head is connected to said detector means for control by an output therefrom;

means for storing and periodically outputting a runout signal representing the eccentricity of said tracks and bands as a function of the rotation of said disk surface; and means for summing said runout signal with the output of said detector means to compensate for said eccentricity as said disk rotates.

2. The improvement recited in claim 1 wherein said access and tracking system includes an amplifier connected to said servo loop, said amplifier having a gain and bandwidth which suppresses significant coupling between said fine access and tracking system and said coarse tracking system, said runout signal being applied to reduce the periodic variation of said detector means as a function of the rotation of said disk surface.

3. The improvement recited in claim 1 wherein said runout signal has a periodic variation at the same frequency as the rotational frequency of said disk.

* * * * *

UNITED STATES PATENT AND TRADEMARK OFFICE
CERTIFICATE OF CORRECTION

PATENT NO. : 4,755,977

DATED : July 5, 1988

INVENTOR(S) : Abed

It is certified that error appears in the above-identified patent and that said Letters Patent is hereby corrected as shown below:

Column 4, line 32, please change "toprovide" to --to provide--.

Column 4, line 43, please change "rotatin" to --rotating--.

Column 12, line 1, please add the following after the word "includes". --a servo loop in said coarse tracking system; and--

Signed and Sealed this

Tenth Day of January, 1989

Attest:

DONALD J. QUIGG

Attesting Officer

Commissioner of Patents and Trademarks